United States Patent [19]

Thüer et al.

[11] Patent Number: 5,264,128
[45] Date of Patent: Nov. 23, 1993

[54] WATER PURIFICATION PROCESS

[75] Inventors: Markus Thüer, Rheinfelden; Gerhard Stucki, Ormalingen; Rolf Bentz, Basel, all of Switzerland

[73] Assignee: Ciba-Geigy Corporation, Ardsley, N.Y.

[21] Appl. No.: 619,274

[22] Filed: Nov. 28, 1990

[30] Foreign Application Priority Data

Dec. 1, 1989 [CH] Switzerland .................. 4296/89

[51] Int. Cl.$^5$ .............................................. C02F 3/06
[52] U.S. Cl. .................................. 210/610; 210/617; 210/908
[58] Field of Search ............... 210/610, 611, 617, 618, 210/908, 909, 627, 631

[56] References Cited

U.S. PATENT DOCUMENTS

| | | | |
|---|---|---|---|
| 4,582,607 | 4/1986 | Kiese et al. | 210/612 |
| 4,655,924 | 4/1987 | Heijnen | 210/617 |
| 4,663,047 | 5/1987 | Krauthausen et al. | 210/617 |
| 4,749,491 | 6/1988 | Lawes et al. | 210/610 |
| 4,954,258 | 9/1990 | Little | 210/611 |
| 4,971,698 | 11/1990 | Weber et al. | 210/615 |
| 4,992,174 | 2/1991 | Caplan et al. | 210/610 |
| 5,006,250 | 4/1991 | Roberts et al. | 210/610 |
| 5,057,221 | 10/1991 | Bryant et al. | 210/610 |

FOREIGN PATENT DOCUMENTS 3816679 11/1989 Fed. Rep. of Germany.

OTHER PUBLICATIONS

Derwent Abstract No: 89-349143.
Dick B. Janssen et al., Applied and Environmental Microbiology, vol. 49, No. 3—pp. 673-677 (Mar. 1985).
A. M. Cook et al., Experientia 39 (1983) pp. 1191-1196.

*Primary Examiner*—Thomas Wyse
*Attorney, Agent, or Firm*—Kevin T. Mansfield; Edward McC. Roberts

[57] ABSTRACT

A process for purifying water, which comprises passing water contaminated with halogenated compounds through one or more fixed or fluidized bed reactors which are connected in series and packed with an adsorbent material which is inoculated with one or more microorganisms. The process results in almost complete elimination of the halogenated hydrocarbons.

11 Claims, No Drawings

WATER PURIFICATION PROCESS

The present inventions relates to a novel process for purifying water contaminated with halogenated compounds and to an apparatus for carrying out said process.

The process comprises passing water which is contaminated with halogenated compounds through a fixed or fluidised bed reactor which is packed with an adsorbent material which is inoculated with one or more microorganisms.

In a further embodiment of the process of the invention, several fixed or fluidised bed reactors may be connected in series.

The inventive feature that the adsorbent material is inoculated with the microorganisms makes it possible to remove more than 90% of the halogenated hydrocarbons with which the water is contaminated. The life of the adsorbent material can consequently be prolonged 5- to 10-fold.

Within the context of this invention, "water" will be understood as comprising contaminated ground water and effluents of the most varied provenance, for example ground water, surface water, sewage from waste dumps, domestic effluent, concentrated effluent, process effluent, industrial wastewater, and mixtures of these effluents.

The halogenated compounds with which the water is contaminated are, in particular, halogenated hydrocarbons. These halogenated hydrocarbons may belong to the class of the aliphatic and also of the aromatic hydrocarbons. The hydrocarbons will usually contain up to 9 carbon atoms and be substituted by one or more halogen atoms, in particular by chlorine atoms. The following non-limitative list of halogenated hydrocarbons will serve to illustrate these compounds: carbon tetrachloride, chloroform, 1,1,2,2-tetrachloroethane, 1,1,1-trichloroethane, 1,2-dichlorethane (of special interest on account of its frequent occurrence), 1,2,3-trichloropropane, tetrachloroethene, trichloroethene, cis- and trans-1,2-dichloroethene, 1,1-dichloroethene, cis-1,3-dichloropropene, 1,2-dichlorobenzene, 1,3-dichlorobenzene, 1,4-dichlorobenzene, 3-chlorotoluene and bromobenzene.

The concentration of halogenated compounds is in general 10 µg/1–10 g/l of water. The concentration is preferably from 100 µg/1–100 mg/l.

The possible adsorbent materials have a large surface are (0.1–1000 m²/g). They may be naturally occurring or synthetic materials. Preferably they are selected from the group consisting of sintered glass, volcanic rock, expanded clay, sand, foam or foamed plastic, and activated carbon. For practical reasons, sintered glass, volcanic rock and activated carbon are preferred. Activated carbon is most preferred.

The eligible microorganisms can be obtained in numerous ways. The microorganisms can be mixed populations. Useful microorganisms can be isolated from sewage sludge or contaminated soil, or else they are used preferably as pure culture. Details on the isolation and cultivation of microorganisms will be found in the article by A. M. Cook et al. in Experientia 39, p. 1191 (1983) and constitute part of this description. A particularly suitable microorganism for degrading halogenated aliphatic compounds is *Xanthobacter autotrophicus* GJ 10 [D. B. Janssen et al, Applied and Environmental Microbiology, 49, p. 673 (1985)].

Owing to the nutrient and oxygen requirement of the microorganisms it may be necessary to add the requisite nutrients, for example in the form of inorganic salts, to the water before passage through the reactor. If necessary, the oxygen concentration of the water can be increased by blowing in air or (technically) pure oxygen, or by the metered addition of nitrate or $H_2O_2$. The "oxygen" will preferably be added as a solution of $H_2O_2$ in water which, depending on the flow rate of the water and on the metering devices, is added in a concentration of 0.5–30%.

It may happen that severely polluted or weakly buffered water becomes overacidified at the exit of the reactor, as the degradation of the halogenated compounds results in an increase of the halide concentration. In such a case it is convenient to add a base such as $NaHCO_3$ to the water, preferably before passage through the fixed or fluidised bed reactor.

The process can be carried out in a temperature range from, for example, 5°–60° C., preferably from 10°–35° C.

Conventional fixed or fluidised bed reactors are used for carrying out the process.

The invention is illustrated by the following non-limitative Examples.

EXAMPLE 1

A column (volume 2 liters), packed with activated carbon, is opened rated as fixed bed circulating reactor. The activated carbon is inoculated with microorganisms (*Xanthobacter autotrophicus*) which degrade 1,2-dichloroethane (DCE). The test ground water used has the following composition:

| | |
|---|---|
| 0–20 mg | of DCE, |
| 1–10 mg | of yeast extract, and |
| 0.1–0.4 mg | of ammonium hydrogenphosphate per liter of mains water. |

The ratio of the individual components to one another is kept constant.

The conductivity of the "ground water" is 0.3–0.5 mS/cm at room temperature (RT).

0.4–0.5 Liter of "ground water" is added to (or taken from) the system per hour.

The addition of oxygen is made by adding 1% $H_2O_2$ solution to the "ground water" before passage through the reactor.

The degradation of DCE is established by determining the difference in the chloride content in the feed and discharge.

The following Table shows the degradation effect, which is again very high even after discontinuation of the feed of DCE without fresh inoculation.

| | DCE | |
|---|---|---|
| Day | feed [mg/l] | discharge [mg/l] |
| 0 | 6.9 | 0 |
| 34 | 6.8 | 2.6 |
| 60 | 8.5 | 1.2 |
| 72 | 6.1 | 0.8 |
| 130 | 12.6 | 1.2 |
| 141 | 4.8 | 0.5 |

-continued

| | DCE | | |
|---|---|---|---|
| Day | feed [mg/l] | discharge [mg/l] | |
| 172 | 10.0 | 2.2 | |

EXAMPLE 2

A column (volume 300 ml) is packed with sintered glass beads ($\phi$3 mm, neutralised) and inoculated with microorganisms which degrade DCE. The test ground water has the following composition:

| 20 ± 2 mg | of DCE, |
|---|---|
| 100 mg | of $(NH_4)_2SO_4$, |
| 25 mg | of $MgSO_4.7 H_2O$, |
| 500 mg | of $Na_2SO_4$ and |
| 50 mg | of $KH_2PO_4$ |
| | per liter of mains water. |

The conductivity of the "ground water" is 0.7–1.2 mS/cm at RT, and the pH is in the range 7–7.5.

The contact time of the "ground water" in the reactor is 2–3 h.

The addition of oxygen is made by adding 1% $H_2O_2$ solution to the "ground water" before passage through the reactor. The degradation of DCE is established by determining the difference in the chloride content in the feed and discharge.

The following Table shows the degradation effect, the amount of DCE added to the water and of the salts being halved in the second half of the experiment.

| | DCE | | |
|---|---|---|---|
| Day | feed [mg/l] | discharge [mg/l] | T [°C.] |
| 12 | 18.7 | 7.6 | 30 |
| 32 | 21.0 | 3.6 | 30 |
| 60 | 21.4 | 2.1 | 30 |
| 75 | 21.7 | 1.4 | 20 |
| 82 | 6.5 | 0.1 | 20 |
| 95 | 9.2 | 0.2 | 20 |
| 120 | 8.5 | 0.3 | 15 |

-continued

| | DCE | | |
|---|---|---|---|
| Day | feed [mg/l] | discharge [mg/l] | T [°C.] |
| 140 | 7.2 | 0.4 | 10 |

What is claimed is:

1. A process for purifying water, which comprises passing water contaminated with halogenated compounds in a concentration of 10 $\mu$g/l–10 g/l through one or more fixed or fluidised bed reactors, connected in series and packed with an adsorbent material selected from the group consisting of sintered glass, volcanic rock or activated carbon, which is inoculated with one or more microorganisms and adding nutrients which supply nitrogen, potassium or phosphorus and $H_2O_2$ to the water before passage through said fixed or fluidised bed reactors and, if necessary, adjusting its pH to 7 to 7.5.

2. A process according to claim 1, wherein the halogenated compounds are halogenated hydrocarbons.

3. A process according to claim 2, wherein the concentration of halogenated hydrocarbons is 100 $\mu$g/l–100 mg/l of water.

4. A process according to claim 2, wherein the halogenated hydrocarbons contain up to 9 carbon atoms at most.

5. A process according to claim 2, wherein the halogenated hydrocarbons are chlorinated and/or brominated hydrocarbons.

6. A process according to claim 2, wherein the halogenated hydrocarbon is 1,2-dichloroethane.

7. A process according to claim 1, wherein the absorbent material is activated carbon.

8. A process according to claim 1, wherein the microorganisms are obtained from a pure culture, from sewage sludge or from contaminated soil.

9. A process according to claim 8, wherein the microorganisms are obtained from a pure culture.

10. A process according to claim 1, wherein a base is added to the water.

11. A process according to claim 1, which comprises passing water contaminated with 0.3–30 mg/l of 1,2-dichloroethane through a fixed bed reactor packed with activated carbon which is inoculated with a microorganism obtained from a pure culture, and adding nutrients and $H_2O_2$ to the water before passage through the reactor.

* * * * *